(12) United States Patent
Qu

(10) Patent No.: US 12,069,619 B2
(45) Date of Patent: Aug. 20, 2024

(54) FEEDBACK RESOURCE DETERMINATION METHOD AND APPARATUS FOR V2X SERVICE, AND STORAGE MEDIUM AND TERMINAL

(71) Applicant: BEIJING UNISOC COMMUNICATIONS TECHNOLOGY CO., LTD., Beijing (CN)

(72) Inventor: Xin Qu, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 334 days.

(21) Appl. No.: 17/599,484

(22) PCT Filed: Mar. 11, 2020

(86) PCT No.: PCT/CN2020/078817
§ 371 (c)(1),
(2) Date: Sep. 28, 2021

(87) PCT Pub. No.: WO2020/192425
PCT Pub. Date: Oct. 1, 2020

(65) Prior Publication Data
US 2022/0191833 A1    Jun. 16, 2022

(30) Foreign Application Priority Data
Mar. 28, 2019 (CN) ......................... 201910243661.X

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04W 72/0446* (2013.01); *H04W 92/18* (2013.01)

(58) Field of Classification Search
CPC . H04W 72/02; H04W 72/0446; H04W 92/18; H04W 4/40; H04L 1/1812; H04L 1/1854; H04L 1/1607
See application file for complete search history.

(56) References Cited

U.S. PATENT DOCUMENTS

2015/0334709 A1    11/2015  Ji et al.
2017/0215183 A1*    7/2017  Gulati ................... H04L 1/1896
(Continued)

FOREIGN PATENT DOCUMENTS

CN    103109472 A    5/2013
CN    106792891 A    5/2017
(Continued)

OTHER PUBLICATIONS

"Joint Resource Allocation With Weighted Max-Min Fairness for NOMA-Enabled V2X Communications", IEEE Access, vol. 6; Oct. 22, 2018.
(Continued)

*Primary Examiner* — Jianye Wu
(74) *Attorney, Agent, or Firm* — Harness, Dickey & Pierce, P.L.C.

(57) ABSTRACT

Provided are feedback resource determination method and apparatus for a V2X service, a storage medium and a terminal. The method includes: acquiring a first resource set including a time domain position of at least one first resource which is a transmission resource for PSSCH; determining a candidate time domain position of a second resource corresponding to the first resource based on the time domain position of the first resource and associated feedback infor- (Continued)

mation, wherein the second resource is a transmission resource for PSFCH, and the associated feedback information indicates a time difference between PSSCH and PSFCH; determining whether symbols occupied by the candidate time domain position include an unavailable symbol which cannot be used to transmit the second resource; determining the candidate time domain position as a time domain position of the second resource based on the symbols occupied by the candidate time domain position not including the unavailable symbol.

20 Claims, 11 Drawing Sheets

(51) Int. Cl.
  *H04W 72/0446* (2023.01)
  *H04W 92/18* (2009.01)

(56) References Cited

U.S. PATENT DOCUMENTS

2022/0085923 A1* 3/2022 Ye ................. H04L 1/1825
2022/0094481 A1* 3/2022 Hong .............. H04L 1/1812

FOREIGN PATENT DOCUMENTS

| CN | 108024266 A | 5/2018 |
| CN | 108923894 A | 11/2018 |
| CN | 109511169 A | 3/2019 |
| WO | WO-2007050676 A1 | 5/2007 |
| WO | WO-2017121324 A1 | 7/2017 |
| WO | WO-2018-062980 A1 | 4/2018 |

OTHER PUBLICATIONS

"RI-1811261 Considerations on Physical Layer aspects of NR V2X", Qualcomm Incorporated, "3GPP TSG RAN WGI Meeting #94bis", pp. 8, 9; Oct. 8, 2018.
"RI-1813866 Discussion on physical layer structures for NR V2X (revised) Samsung": 10 3GPP, PSFCH and V2X and ((time differ+) or (time interval) and PD; Nov. 12, 2018.
"RI-1901323 Feature lead summary for agenda item 7.2.4.1.2 Physical layer procedures": 10 3GPP, PSFCH and V2X and ((time differ+) or (time interval)) and PD; Jan. 21, 2019.
Chinese Office Action regarding Patent Application No. 201910243661X, dated Jan. 25, 2022.
European Search Report dated Nov. 8, 2022, in corresponding European Application No. 20778168.3.
Qualcomm Incorporated. "Considerations on Physical Layer aspects of NR V2X" 3GPP TSG RAN WG1 Meeting #94bis. R1-1811261 Chengu, China, Oct. 12, 2018 (Oct. 12, 2018), Section 5 (11 pages).
International Search Report (English and Chinese) and Written Opinion (Chinese) of the International Searching Authority issued in PCT/CN2020/078817, dated May 28, 2020; ISA/CN (8 pages).
HU Heng et al., "A Resource Allocation Mechanism Based on Resource Pool in Vehicle-Vehicle Communication", Guangdong Communication Technology, Issue 12, Dec. 15, 2016.

\* cited by examiner the UE determines a candidate slot where the second resource is located based on a slot where a termination position of the first resource is located and the associated feedback information — S1021 the UE determines the candidate time domain position of the second resource in the candidate slot based on configured or pre-configured position information of the second resource in the candidate slot — S1022

FIG. 2

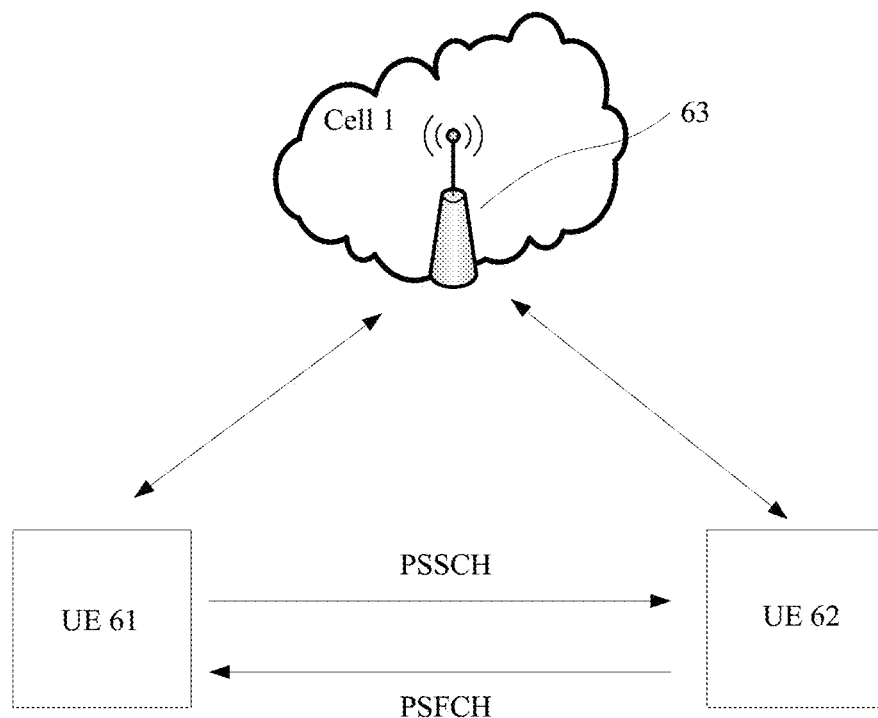

FIG. 3

FEEDBACK RESOURCE DETERMINATION METHOD AND APPARATUS FOR V2X SERVICE, AND STORAGE MEDIUM AND TERMINAL

CROSS-REFERENCE TO RELATED APPLICATIONS

This application is a National Stage of International Application No. PCT/CN2020/078817, filed on Mar. 11, 2020, which claims the priority to Chinese Application No. 201910243661.X, filed on Mar. 28, 2019, both of which are incorporated herein by reference.

TECHNICAL FIELD

The present disclosure generally relates to communication technology field, and more particularly, to a feedback resource determination method and apparatus for vehicle-to-everything (V2X) service, a storage medium and a terminal.

BACKGROUND

With the development of the 3rd Generation Partnership Project (3GPP), New Radio (NR) V2X as a key technical direction of Release 16 (R16) of a standard is being studied. NR V2X, as an enhancement of Long Term Evolution (LTE) V2X, is a key technical means to enable the Internet of Vehicles.

To meet various service needs of the Internet of Vehicles, NR V2X supports three data transmission modes including unicast, multicast and broadcast. To improve reliability of unicast and multicast communication, 3GPP has reached an agreement through discussion to introduce a feedback mechanism in unicast and multicast, such as Hybrid Automatic Repeat reQuest (HARQ) feedback mechanism. HARQ feedback content is included in Sidelink Feedback Control Information (SFCI) for transmission, and the SFCI is carried by a Physical Sidelink Feedback Channel (PSFCH, also referred to as Sidelink Feedback Channel).

The latest standard further determines that a time difference between a Physical Sidelink Shared Channel (PSSCH, also referred to as Sidelink Shared Channel) and its associated PSFCH can be acquired by network configuration or pre-configuration.

In LTE V2X, resource pools are configured for PSSCH and Physical Sidelink Control Channel (PSCCH, also referred to as Sidelink Control Channel) through network configuration or pre-configuration. The resource pools include multiple resources. In practice, User Equipment (UE) can transmit data or control signaling on one or more resources in a transmission resource pool, and receive data or control signaling on one or more resources in a reception resource pool.

SUMMARY

By embodiments of the present disclosure, a UE in an NR V2X scenario may efficiently and accurately determine resources for PSFCH.

In an embodiment of the present disclosure, a feedback resource determination method for V2X service is provided, including: acquiring a first resource set, wherein the first resource set includes a time domain position of at least one first resource which is a transmission resource for a PSSCH; for each of the at least one first resource, determining a candidate time domain position of a second resource corresponding to the first resource based on the time domain position of the first resource and associated feedback information, wherein the second resource is a transmission resource for a PSFCH, and the associated feedback information indicates a time difference between the PSSCH and the PSFCH; for each candidate time domain position, determining whether symbols occupied by the candidate time domain position include an unavailable symbol, wherein the unavailable symbol is a symbol that cannot be used to transmit the second resource; and determining the candidate time domain position as a time domain position of the second resource based on the symbols occupied by the candidate time domain position not including the unavailable symbol.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

BRIEF DESCRIPTION OF THE DRAWINGS

FIG. 2 is a flow chart of S102 as shown in FIG. 1 according to an embodiment;

FIG. 3 is a communication diagram of an application scenario according to an embodiment;

DETAILED DESCRIPTION

As described in the background, sidelink feedback mechanisms in NR V2X scenarios are imperfect, thus the UE in NR V2X scenarios is unable to acquire the resources for PSFCH from resource pools configured by the network or pre-configured.

In an embodiment of the present disclosure, a feedback resource determination method for V2X service is provided, including: acquiring a first resource set, wherein the first resource set includes a time domain position of at least one first resource which is a transmission resource for a PSSCH; for each of the at least one first resource, determining a candidate time domain position of a second resource corresponding to the first resource based on the time domain position of the first resource and associated feedback information, wherein the second resource is a transmission resource for a PSFCH, and the associated feedback information indicates a time difference between the PSSCH and the PSFCH; for each candidate time domain position, determining whether symbols occupied by the candidate time domain position include an unavailable symbol, wherein the unavailable symbol is a symbol that cannot be used to transmit the second resource; and determining the candidate time domain position as a time domain position of the second resource based on the symbols occupied by the candidate time domain position not including the unavailable symbol.

By embodiments of the present disclosure, a UE in an NR V2X scenario may efficiently and accurately determine resources for PSFCH without extra signaling configuration, thereby reducing signaling overhead.

The time difference between the PSSCH and the PSFCH is determined based on the associated feedback information, and for each first resource, the time domain position of the first resource is added to the time difference to acquire the candidate time domain position of the corresponding second resource.

Further, whether the candidate time domain position can be used as the time domain position of the second resource is determined based on the symbols occupied by the candidate time domain position, so as to exclude the candidate time domain that contains an unavailable symbol.

In order to clarify the objects, characteristics and advantages of the disclosure, embodiments of present disclosure will be described in detail in conjunction with accompanying drawings.

Figure 1:
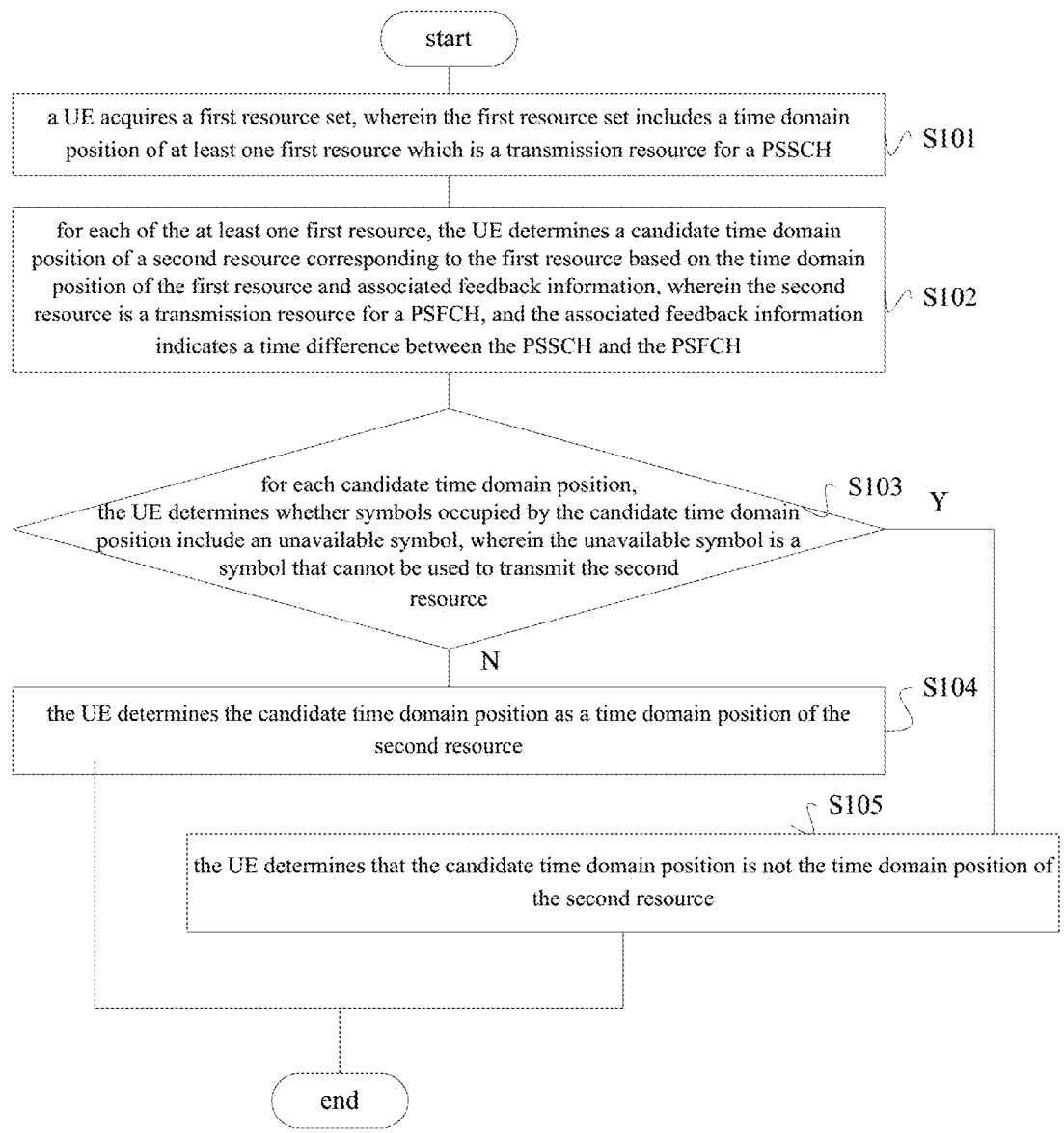
FIG. 1 is a flow chart of a feedback resource determination method for V2X service according to an embodiment.

FIG. 1 is a flow chart of a feedback resource determination method for V2X service according to an embodiment. The embodiment may be applied to Internet of Vehicles, such as an NR V2X scenario. The embodiment may be performed by a UE side, for example, by a UE as a sender and/or a receiver. The UE may perform HARQ feedback in a unicast or multicast mode using a feedback resource determined by solutions of the embodiment.

Referring to FIG. 1, the method may include S101 to S105.

In S101, a UE acquires a first resource set, wherein the first resource set includes a time domain position of at least one first resource which is a transmission resource for a PSSCH.

In S102, for each of the at least one first resource, the UE determines a candidate time domain position of a second resource corresponding to the first resource based on the time domain position of the first resource and associated feedback information, wherein the second resource is a transmission resource for a PSFCH, and the associated feedback information indicates a time difference between the PSSCH and the PSFCH.

In S103, for each candidate time domain position, the UE determines whether symbols occupied by the candidate time domain position include an unavailable symbol, wherein the unavailable symbol is a symbol that cannot be used to transmit the second resource.

In S104, the UE determines the candidate time domain position as a time domain position of the second resource based on the symbols occupied by the candidate time domain position not including the unavailable symbol.

In S105, the UE determines that the candidate time domain position is not the time domain position of the second resource based on the symbols occupied by the candidate time domain position including the unavailable symbol.

In some embodiments, the first resource and the second resource are both resources of a sidelink, and the resources of the sidelink multiplex resources allocated by the base station to the UE for data transmission through a Uu interface (also referred to as transmission resources of a Uu link).

For example, the base station may allocate resource pools for the UE in a configuration or pre-configuration manner, and the resource pools may be shared by the Uu link and the sidelink, where the resource pools may include a sending resource pool and a reception resource pool.

Further, the first resource set may be acquired by configuration or pre-configuration. The first resource set may indicate time domain positions of first resources in the resource pools.

For example, the first resource set may be indicated by downlink signaling (such as RRC signaling) transmitted in advance by the base station.

For another example, the first resource set may be pre-configured in a Subscriber Identification Module (SIM card) associated with the UE.

Further, the unavailable symbol may refer to a symbol occupied by a transmission resource of the Uu link that cannot be multiplexed by a sidelink.

For example, the unavailable symbol may include a downlink symbol of the Uu link. Accordingly, in S103, if the symbols occupied by the candidate time domain position are all non-downlink symbols of the Uu link, it may be determined that the candidate time domain position is the time domain position of the second resource. The non-downlink symbols may include uplink symbols and flexible symbols. A data transmission direction on the flexible symbols can be adjusted based on configuration or a manner dynamical indicated by the base station.

For another example, the unavailable symbol may include downlink symbols and flexible symbols of the Uu link. Accordingly, in S103, if the symbols occupied by the candidate time domain position are all uplink symbols of the Uu link, it may be determined that the candidate time domain position is the time domain position of the second resource.

Further, the uplink symbols and the non-downlink symbols correspond to semi-static uplink and downlink slot structure configuration of the NR Uu link, including cell-specific semi-static DL/UL assignment and UE-specific semi-static DL/UL assignment.

Further, based on provisions of standards, in the scenario where the Uu link and the sidelink share resources, the sidelink may not multiplex the downlink symbols of the Uu link. Therefore, the unavailable symbol may be a symbol that cannot be used to transmit the first resource.

In some embodiments, the associated feedback information may include configured or pre-configured information about a time difference between the PSSCH and the PSFCH. For example, if a bit value of the associated feedback information is non-zero, the bit value is the time difference between the PSSCH and PSFCH. For another example, if the bit value of the associated feedback information is zero, it indicates that the base station has not configured a corresponding feedback resource for the UE.

In some embodiments, the associated feedback information may include indication information on whether there is a corresponding feedback resource, and a time difference between the PSSCH and the PSFCH when the indication information indicates that there is a corresponding feedback resource. For example, the associated feedback information may include 3 bits, where the first bit indicates whether there is a corresponding feedback resource, and 0 means no and 1 means yes. Further, when the first bit is 1, the following two bits indicate the time difference between the PSSCH and the PSFCH. In some embodiments, 00 indicates that the time difference is 1 slot, 01 indicates that the time difference is 2 slots, 10 indicates that the time difference is 3 slots, and 11 indicates that the time difference is 4 slots.

In practice, those skilled in the art can adjust a number of bits included in the associated feedback information and meaning of each bit according to practical requirements.

Further, the associated feedback information may be determined by configuration or pre-configuration.

Further, the first resource set may have a one-to-one correspondence with the associated feedback information. For different first resource sets, different associated feedback information may be configured or pre-configured. For example, the time difference included in the associated feedback information corresponding to first resource set 1 may be 1 slot, and the time difference included in the associated feedback information corresponding to first resource set 2 may be 2 slots.

In some embodiments, the second resource may be a reception resource based on the first resource being a sending resource. For example, the first resource set may be a PSSCH sending resource set, and the second resource may be a PSFCH reception resource.

In some embodiments, the second resource may be a sending resource based on the first resource being a reception resource. For example, the first resource set may be a PSSCH reception resource set, and the second resource may be a PSCCH sending resource.

In some embodiments, referring to FIG. 2, S102 may include S1021 and S1022.

In S1021, the UE determines a candidate slot where the second resource is located based on a slot where a termination position of the first resource is located and the associated feedback information.

In S1022, the UE determines the candidate time domain position of the second resource in the candidate slot based on configured or pre-configured position information of the second resource in the candidate slot.

In some embodiments, the termination position of the first resource may be a position of a last symbol occupied by the first resource on the slot.

In some embodiments, the time difference between the PSSCH and the PSFCH indicated in the associated feedback information may be a slot difference.

Further, in S1021, a slot where the last symbol occupied by the first resource is located may be determined, and the slot is added to the slot difference indicated by the associated feedback information to acquire the candidate slot.

Further, in S1022, it is assumed that the last symbol of the first resource is located in slot 5, the slot difference is 3 slots, and the second resource indicated by configuration or pre-configuration is located within symbol 12 to symbol 13 in a slot, it is determined that the second resource is located in symbol 12 to symbol 13 of slot 8.

Referring to FIG. 3, in an application scenario, UE 61 and UE 62 perform unicast communication. UE 61 transmits unicast data to UE 62, and after receiving unicast data from UE 61, UE 62 transmits HARQ feedback information based on a decoding result of the unicast data. The unicast data is carried by a PSSCH, and the HARQ feedback information is carried by a PSFCH.

Further, both the unicast data communication and the HARQ feedback communication between UE 61 and UE 62 use resources of a sidelink for transmission. The resources of the sidelink share transmission resources of the Uu link. Therefore, to determine the transmission resources available for the PSFCH, UE 62 and the UE 61 need to determine feedback resources for PSSCH transmission allocated by base station 63. The base station 63 is used to maintain network communication of cell 1.

In the below embodiment, the first resource set is a PSSCH reception resource set and the second resource is a PSFCH sending resource.

Figure 4:
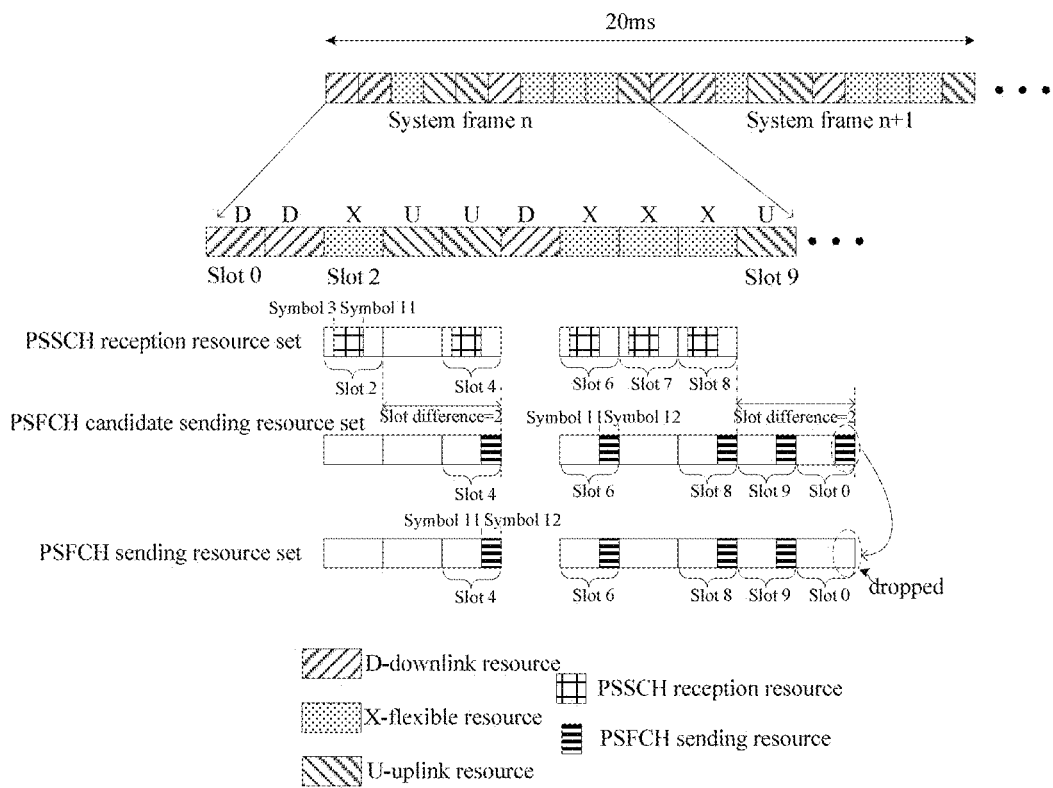
FIG. 4 is a diagram of a feedback resource determining process where the method as shown in FIG. 1 is applied to the scenario as shown in FIG. 3 according to an embodiment.

FIG. 4 exemplarily illustrates a time domain position of a transmission resource of the Uu link allocated by base station 63 in a slot of 20 milliseconds (ms). The transmission resource of the Uu link repeats in a time domain with a period of 10 ms.

As shown in FIG. 4, taking a system frame n as an example, assume that a slot structure of the Uu link in a period of 10 ms is DDXUUDXXXU, where each letter represents a direction of one slot, D represents downlink, X represents flexible, and U represents uplink. For example, a direction of slot 0 is D, indicating that a data transmission direction of slot 0 is downlink, and symbols of this slot are all downlink symbols. A direction of slot 2 is X, indicating that a data transmission direction of slot 2 is flexible, and symbols of this slot are all flexible symbols. A direction of slot 3 is U, indicating that a data transmission direction of slot 3 is uplink, and symbols of this slot are all uplink symbols.

Based on provisions of standards, resources of the sidelink (including the first resource and the second resource) cannot multiplex downlink symbols of the Uu link. In the example as shown in FIG. 4, during unicast communication between UE 61 and UE 62, UE 61 and UE 62 cannot use slots 0, 1 and 5 for data transmission and HARQ feedback.

Continuing to refer to FIG. 4, it is assumed that UE 62 knows that time domain positions of its PSSCH reception resource set within 10 ms are slot 2, slot 4, and slots 6 to 8 through configuration of the base station. In addition, each PSSCH reception resource merely occupies symbol 3 to symbol 11 of the corresponding slot.

Further, the base station configures feedback resources associated with the PSSCH reception resource set, and the associated feedback information indicates that a time difference between the PSSCH and the PSFCH is 2 slots.

Therefore, when UE 62 receives data in the configured PSSCH reception resource set and needs to send a feedback, according to the feedback resource determination method as shown in FIG. 1 and FIG. 2, UE 62 may add the time difference to a slot where a termination position of each reception resource in the PSSCH reception resource set is located so as to acquire a candidate slot. Specifically, in the example as shown in FIG. 4, the time difference of 2 slots is added to slot 2 to acquire slot 4; the time difference of 2 slots is added to slot 4 to acquire slot 6; the time difference of 2 slots is added to slot 6 to acquire slot 8; the time difference of 2 slots is added to slot 7 to acquire slot 9; and the time difference of 2 slots is added to slot 8 to acquire slot 0 of a next system frame (i.e., a system frame (n+1)).

Further, the PSFCH sending resource in the PSFCH sending resource set may be determined to be located at symbol 11 to symbol 12 of a slot by configuration or pre-configuration.

Therefore, it is determined that symbols 11 to 12 of slot 4 of the system frame n, symbols 11 to 12 of slot 6 of the system frame n, symbols 11 to 12 of slot 8 of the system frame n, symbols 11 to 12 of slot 9 of the system frame n, and symbol 11 to symbol 12 of slot 0 of the system frame (n+1) are the candidate time domain positions of the PSFCH sending resource in the embodiment. These slots may form the PSFCH candidate sending resource set in the embodiment.

When the unavailable symbol includes the downlink symbol of the Uu link, as slot 4 and slot 9 of the system frame n correspond to uplink rather than downlink of the Uu link, symbols 11 to 12 of slot 4 and slot 9 can serve as a slot position of the PSFCH sending resource set. As slot 6 and slot 8 of the system frame n correspond to flexible rather than downlink of the Uu link, symbols 11 to 12 of slot 6 and slot 8 can serve as a slot position of the PSFCH sending resource set. As slot 0 of the system frame (n+1) corresponds to downlink of the Uu link, symbols 11 to 12 of slot 0 cannot serve as a slot position of the PSFCH sending resource set.

Therefore, in the embodiment as shown in FIG. 4, the determined PSFCH sending resource set includes symbols 11 to 12 of slots 4, 6, 8 and 9, while symbols 11 to 12 of slot 0 in the PSFCH candidate sending resource set are dropped.

When the unavailable symbol includes the downlink symbols and flexible symbols of the Uu link, as merely slot 4 and slot 9 correspond to uplink rather than downlink or flexible of the Uu link, the determined PSFCH sending resource set includes symbols 11 to 12 of slots 4 and 9, while symbols 11 to 12 of slots 6, 8 and 0 in the PSFCH candidate sending resource set are dropped.

In the below embodiment, the first resource set is a PSSCH sending resource set and the second resource is a PSFCH reception resource.

Figure 5:
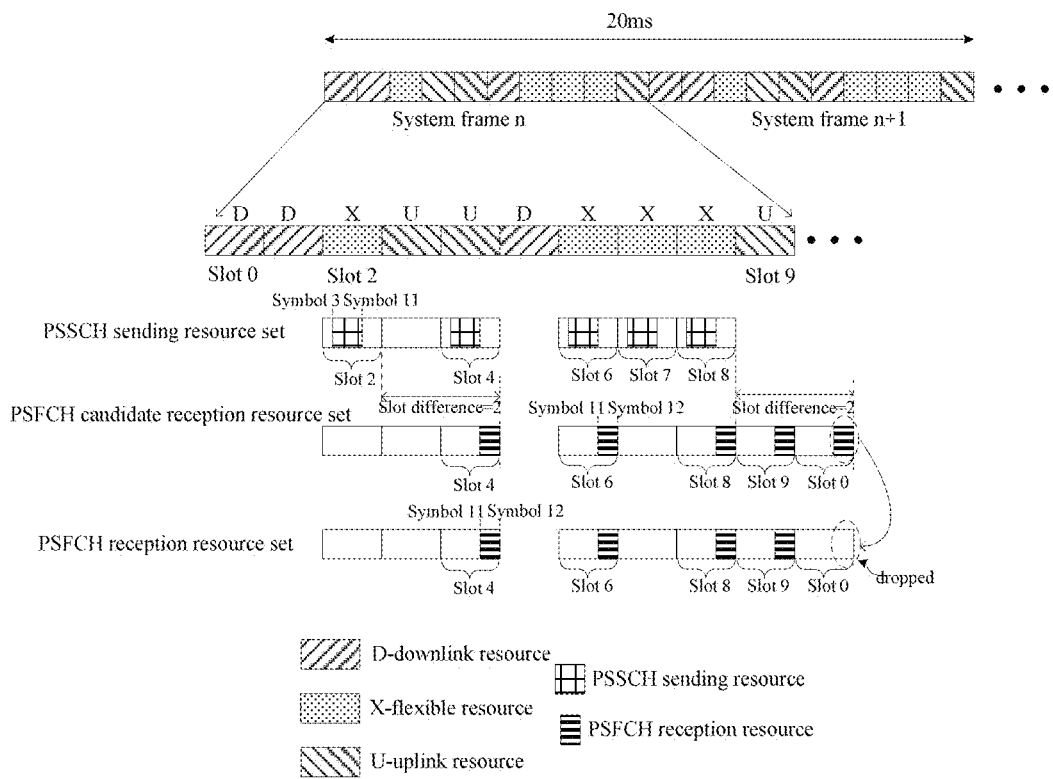
FIG. 5 is a diagram of a feedback resource determining process where the method as shown in FIG. 1 is applied to the scenario as shown in FIG. 3 according to another embodiment.

FIG. 5 exemplarily illustrates a time domain position of a transmission resource of the Uu link allocated by base station 63 in a slot of 20 milliseconds (ms). The transmission resource of the Uu link repeats in the time domain with a period of 10 ms.

As shown in FIG. 5, taking a system frame n as an example, assume that a slot structure of the Uu link in a period of 10 ms is DDXUUDXXXU, where each letter represents a direction of one slot, D represents downlink, X represents flexible, and U represents uplink. For example, a direction of slot 0 is D, indicating that a data transmission direction of slot 0 is downlink, and symbols of this slot are all downlink symbols. A direction of slot 2 is X, indicating that a data transmission direction of slot 2 is flexible, and symbols of this slot are all flexible symbols. A direction of slot 3 is U, indicating that a data transmission direction of slot 3 is uplink, and symbols of this slot are all uplink symbols.

Based on provisions of standards, resources of the sidelink (including the first resource and the second resource) cannot multiplex downlink symbols of the Uu link. In the example as shown in FIG. 5, during unicast communication between UE 61 and UE 62, UE 61 and UE 62 cannot use slots 0, 1 and 5 for data transmission and HARQ feedback.

Continuing to refer to FIG. 5, it is assumed that UE 61 knows that time domain positions of its PSSCH sending resource set within 10 ms are slot 2, slot 4, and slots 6 to 8 through configuration of the base station. In addition, each PSSCH sending resource merely occupies symbol 3 to symbol 11 of the corresponding slot.

Further, the base station configures feedback resources associated with the PSSCH sending resource set, and the associated feedback information indicates that a time difference between the PSSCH and the PSFCH is 2 slots.

Therefore, when UE 61 transmits data in the configured PSSCH sending resource set and needs to receive a feedback, according to the feedback resource determination method as shown in FIG. 1 and FIG. 2, UE 61 may add the time difference to a slot where a termination position of each sending resource in the PSSCH sending resource set is located so as to acquire a candidate slot. Specifically, in the example as shown in FIG. 5, the time difference of 2 slots is added to slot 2 to acquire slot 4; the time difference of 2 slots is added to slot 4 to acquire slot 6; the time difference of 2 slots is added to slot 6 to acquire slot 8; the time difference of 2 slots is added to slot 7 to acquire slot 9; and the time difference of 2 slots is added to slot 8 to acquire slot 0 of a next system frame (i.e., a system frame (n+1)).

Further, the PSFCH reception resource in the PSFCH reception resource set may be determined to be located at symbol 11 to symbol 12 of a slot by configuration or pre-configuration.

Therefore, it is determined that symbols 11 to 12 of slot 4 of the system frame n, symbols 11 to 12 of slot 6 of the system frame n, symbols 11 to 12 of slot 8 of the system frame n, symbols 11 to 12 of slot 9 of the system frame n, and symbol 11 to symbol 12 of slot 0 of the system frame (n+1) are the candidate time domain positions of the PSFCH reception resource in the embodiment. These slots may form the PSFCH candidate reception resource set in the embodiment.

When the unavailable symbol includes the downlink symbol of the Uu link, as slot 4 and slot 9 of the system frame n correspond to uplink rather than downlink of the Uu link, symbols 11 to 12 of slot 4 and slot 9 can serve as a slot position of the PSFCH reception resource set. As slot 6 and slot 8 of the system frame n correspond to flexible rather than downlink of the Uu link, symbols 11 to 12 of slot 6 and slot 8 can serve as a slot position of the PSFCH reception resource set. As slot 0 of the system frame (n+1) corresponds to downlink of the Uu link, symbols 11 to 12 of slot 0 cannot serve as a slot position of the PSFCH reception resource set.

Therefore, in the embodiment as shown in FIG. 5, the determined PSFCH reception resource set includes symbols 11 to 12 of slots 4, 6, 8 and 9, while symbols 11 to 12 of slot 0 in the PSFCH candidate reception resource set are dropped.

When the unavailable symbol includes the downlink symbols and flexible symbols of the Uu link, as merely slot 4 and slot 9 correspond to uplink rather than downlink or flexible of the Uu link, the determined PSFCH reception resource set includes symbols 11 to 12 of slots 4 and 9, while symbols 11 to 12 of slots 6, 8 and 0 in the PSFCH candidate reception resource set are dropped.

From above, by embodiments of the present disclosure, a UE in an NR V2X scenario may efficiently and accurately determine resources for PSFCH without extra signaling configuration, thereby reducing signaling overhead. The time difference between the PSSCH and the PSFCH is determined based on the associated feedback information, and for each first resource, the time domain position of the first resource is added to the time difference to acquire the candidate time domain position of the corresponding second resource. Further, whether the candidate time domain position can be used as the time domain position of the second resource is determined based on the symbols occupied by the candidate time domain position, so as to exclude the candidate time domain that contains an unavailable symbol.

Figure 6:
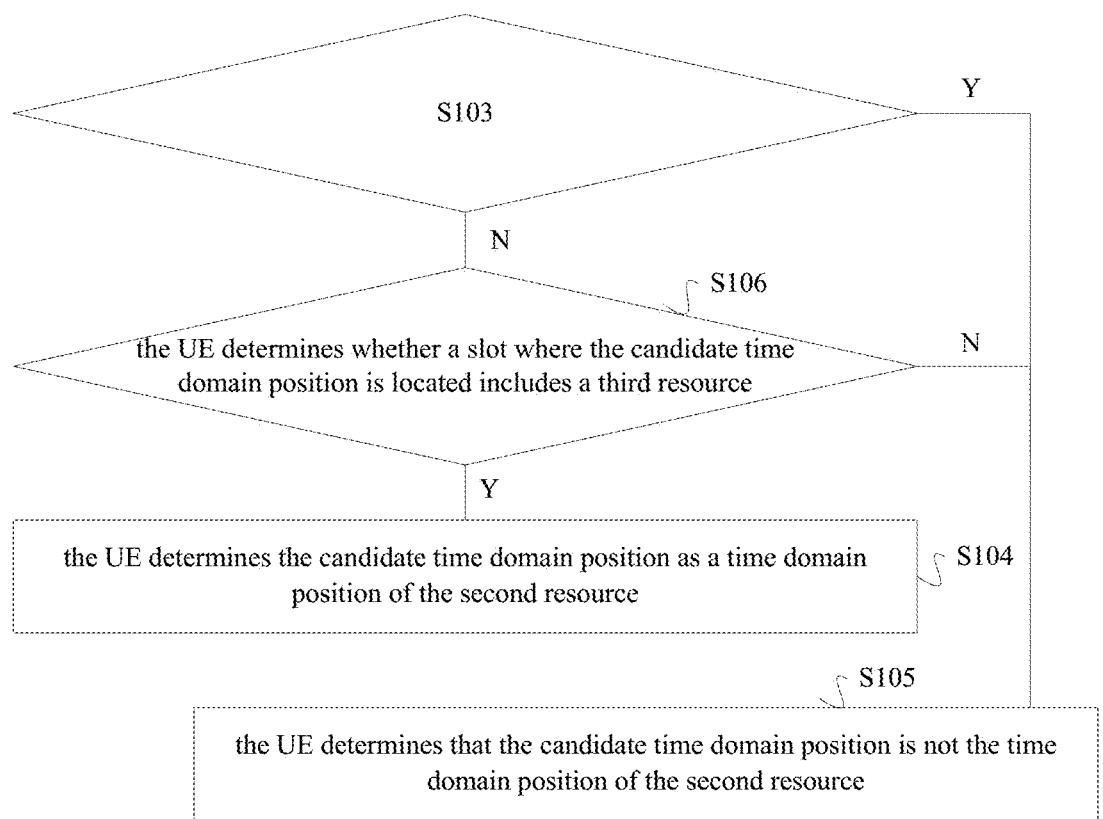
FIG. 6 is a flow chart of a feedback resource determination method for V2X service according to an embodiment.

Alternatively, referring to FIG. 6, in some embodiments, based on the symbols occupied by the candidate time domain position not including the unavailable symbol, the method may further include S106 prior to S104.

In S106, the UE determines whether a slot where the candidate time domain position is located includes a third resource based on the symbols occupied by the candidate time domain position not including the unavailable symbol, wherein the third resource is a transmission resource for the PSSCH or the PSCCH, and a data transmission direction of the third resource is different from a data transmission direction of the first resource.

Based on a determination result of S106 being that the slot where the candidate time domain position is located includes the third resource, S104 is performed, that is, the UE determines the candidate time domain position as the time domain position of the second resource.

Based on a determination result of S106 being that the slot where the candidate time domain position is located does not include the third resource, S105 is performed, that is, the UE determines that the candidate time domain position is not the time domain position of the second resource.

Therefore, integrity of transmission resources of the Uu link may be improved, and complexity of the UE may be reduced. Specifically, by the determination step, the candidate time domain positions whose corresponding slots do not contain the fourth resource may be excluded, so as to ensure the integrity of the transmission resources of the Uu link. In other words, by using the candidate time domain position in the slot that contains the third resource as the time domain position of the second resource, the transmission resources of the Uu link multiplexed by the resources of the sidelink (especially the transmission resource of the Uu link that does not include the third resource) are prevented from being frequently interrupted. Further, the data transmission direction of the third resource is the same as the data transmission direction of the first resource, that is, the data transmission direction of the third resource is different from the data transmission direction of the second resource. Therefore, the UE transmits data in the same direction in the slot, and does not need to frequently switch between receiving and transmitting operations in a single slot, which makes it possible to reduce the complexity of the UE.

In some embodiments, the third resource may be the resource of the sidelink.

More specifically, the third resource may be acquired by configuration or pre-configuration. For example, by configuring or pre-configuring the third resource set, a time domain position of each third resource included in the third resource set in the resource pool is indicated.

In some embodiments, when the first resource is a sending resource, the second resource may be a reception resource, and the third resource may be a reception resource. For example, the first resource set may be a PSSCH sending resource set, the second resource may be a PSFCH reception resource, and the third resource may be a PSSCH reception resource or a PSCCH reception resource.

Alternatively, in some embodiments, if the first resource is a reception resource, the second resource may be a sending resource, and the third resource may be a sending resource. For example, the first resource set may be a PSSCH reception resource set, the second resource may be a PSFCH sending resource, and the third resource may be a PSSCH sending resource or a PSCCH sending resource.

In the below embodiment, the first resource set is the PSSCH reception resource set, the second resource is the PSFCH sending resource, and the third resource is the sending resource in the PSSCH sending resource set.

Figure 7:
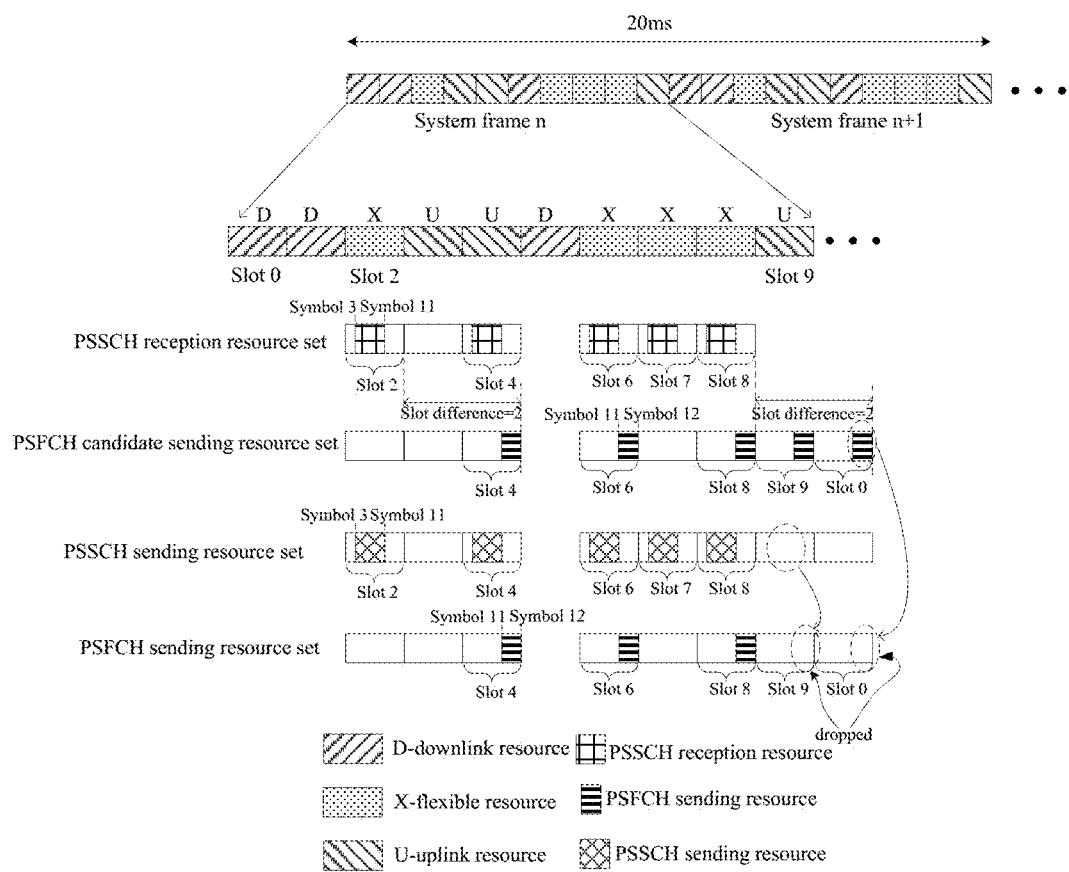
FIG. 7 is a diagram of a feedback resource determining process where the method as shown in FIG. 6 is applied to the scenario as shown in FIG. 3 according to an embodiment.

FIG. 7 exemplarily illustrates a time domain position of a transmission resource of the Uu link allocated by base station 63 in a slot of 20 milliseconds (ms). The transmission resource of the Uu link repeats in a time domain with a period of 10 ms.

As shown in FIG. 7, taking a system frame n as an example, assume that a slot structure of the Uu link in a period of 10 ms is DDXUUDXXXU, where each letter represents a direction of one slot, D represents downlink, X represents flexible, and U represents uplink. For example, a direction of slot 0 is D, indicating that a data transmission direction of slot 0 is downlink, and symbols of this slot are all downlink symbols. A direction of slot 2 is X, indicating that a data transmission direction of slot 2 is flexible, and symbols of this slot are all flexible symbols. A direction of slot 3 is U, indicating that a data transmission direction of slot 3 is uplink, and symbols of this slot are all uplink symbols.

Based on provisions of standards, resources of the sidelink (including the first resource and the second resource) cannot multiplex downlink symbols of the Uu link. In the example as shown in FIG. 7, during unicast communication between UE 61 and UE 62, UE 61 and UE 62 cannot use slots 0, 1 and 5 for data transmission and HARQ feedback.

Continuing to refer to FIG. 7, it is assumed that UE 62 knows that time domain positions of its PSSCH reception resource set within 10 ms are slot 2, slot 4, and slots 6 to 8 through configuration of the base station. In addition, each PSSCH reception resource merely occupies symbol 3 to symbol 11 of the corresponding slot.

Further, the base station configures feedback resources associated with the PSSCH reception resource set, and the associated feedback information indicates that a time difference between the PSSCH and the PSFCH is 2 slots.

Therefore, when UE 62 receives data in the configured PSSCH reception resource set and needs to send a feedback, according to the feedback resource determination method as shown in FIG. 1 and FIG. 2, UE 62 may add the time difference to a slot where a termination position of each reception resource in the PSSCH reception resource set is located so as to acquire a candidate slot. Specifically, in the example as shown in FIG. 7, the time difference of 2 slots is added to slot 2 to acquire slot 4; the time difference of 2 slots is added to slot 4 to acquire slot 6; the time difference of 2 slots is added to slot 6 to acquire slot 8; the time difference of 2 slots is added to slot 7 to acquire slot 9; and the time difference of 2 slots is added to slot 8 to acquire slot 0 of a next system frame (i.e., a system frame (n+1)).

Further, the PSFCH sending resource in the PSFCH sending resource set may be determined to be located at symbol 11 to symbol 12 of a slot by configuration or pre-configuration.

Therefore, it is determined that symbols 11 to 12 of slot 4 of the system frame n, symbols 11 to 12 of slot 6 of the system frame n, symbols 11 to 12 of slot 8 of the system frame n, symbols 11 to 12 of slot 9 of the system frame n, and symbol 11 to symbol 12 of slot 0 of the system frame (n+1) are the candidate time domain positions of the PSFCH sending resource in the embodiment. These slots may form the PSFCH candidate sending resource set in the embodiment.

When the unavailable symbol includes the downlink symbol of the Uu link, as slot 0 of the system frame (n+1) corresponds to downlink of the Uu link, symbols 11 to 12 of slot 0 cannot serve as a slot position of the PSFCH sending resource set.

The time domain position of each PSSCH sending resource in the PSSCH sending resource set of UE 62 may be determined by configuration or pre-configuration. Specifically, as shown in FIG. 7, assume that a time domain position of the PSSCH sending resource included in the PSSCH sending resource set is consistent with a time domain position of the PSSCH reception resource included in the PSSCH reception resource set.

Further, by performing steps as shown in FIG. 6, the PSFCH candidate sending resources that do not meet requirements in the PSFCH candidate sending resource set can be excluded based on the PSSCH sending resource set.

As slot 4, slot 6 and slot 8 include PSSCH sending resources, symbols 11 to 12 of slots 4, 6 and 8 can serve as slot positions of the PSFCH sending resource set.

As slot 9 does not include a PSSCH sending resource, symbols 11 to 12 of slot 9 cannot serve as a slot position of the PSFCH sending resource set.

Therefore, in the embodiment as shown in FIG. 7, the determined PSFCH sending resource set includes symbols 11 to 12 of slots 4, 6 and 8, while symbols 11 to 12 of slots 9 and 0 in the PSFCH candidate sending resource set are dropped.

When the unavailable symbol includes the downlink symbols and flexible symbols of the Uu link, as merely slot 4 and slot 9 correspond to uplink rather than downlink or flexible of the Uu link, the determined PSFCH sending resource set includes symbols 11 to 12 of slot 4, while symbols 11 to 12 of slots 6, 8, 9 and 0 in the PSFCH candidate sending resource set are dropped.

It should be noted that FIG. 7 takes the PSSCH sending resource set as an example for description, however, in practice, those skilled in the art may use the PSCCH sending resource set as a screening standard to determine a suitable PSFCH sending resource set.

In the below embodiment, the first resource set is a PSSCH sending resource set, the second resource is a PSFCH reception resource, and the third resource is a resource in a PSSCH reception resource set.

Figure 8:
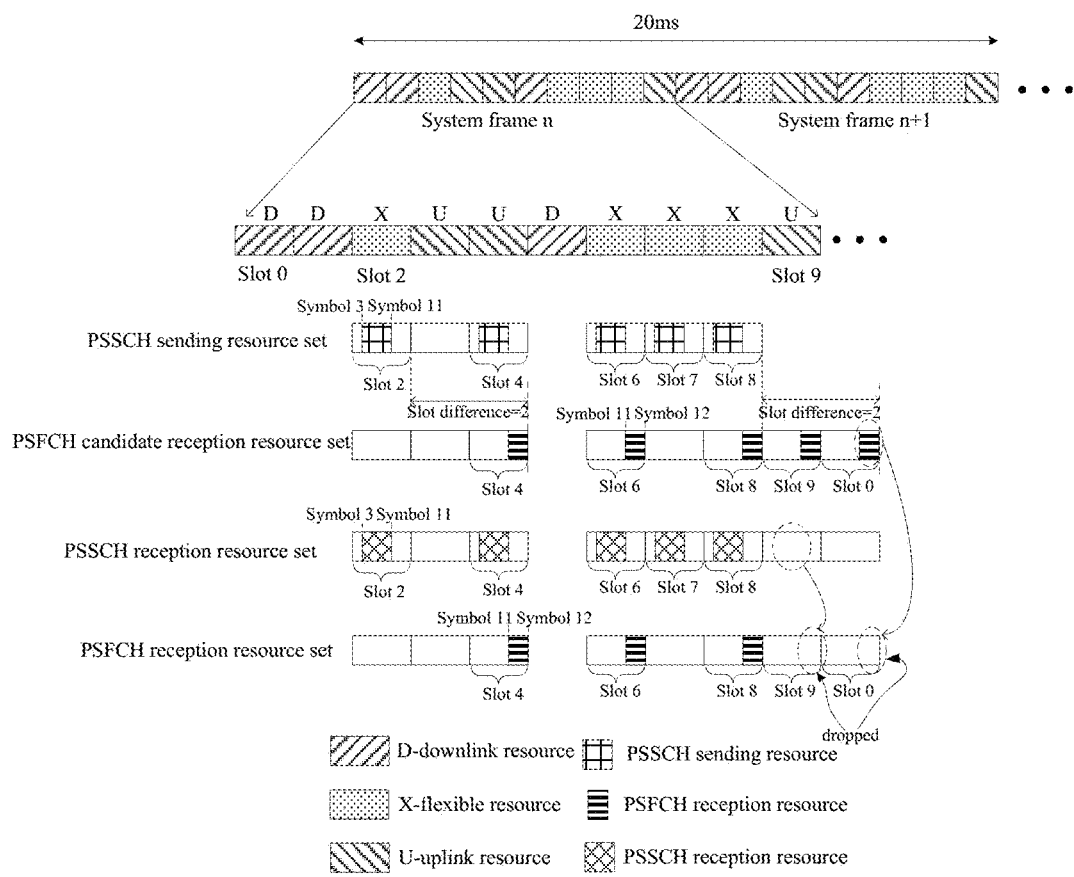
FIG. 8 is a diagram of a feedback resource determining process where the method as shown in FIG. 6 is applied to the scenario as shown in FIG. 3 according to another embodiment.

FIG. 8 exemplarily illustrates a time domain position of a transmission resource of the Uu link allocated by base station 63 in a slot of 20 milliseconds (ms). The transmission resource of the Uu link repeats in the time domain with a period of 10 ms.

As shown in FIG. 8, taking a system frame n as an example, assume that a slot structure of the Uu link in a period of 10 ms is DDXUUDXXXU, where each letter represents a direction of one slot, D represents downlink, X represents flexible, and U represents uplink. For example, a direction of slot 0 is D, indicating that a data transmission direction of slot 0 is downlink, and symbols of this slot are all downlink symbols. A direction of slot 2 is X, indicating that a data transmission direction of slot 2 is flexible, and symbols of this slot are all flexible symbols. A direction of slot 3 is U, indicating that a data transmission direction of slot 3 is uplink, and symbols of this slot are all uplink symbols.

Based on provisions of standards, resources of the sidelink (including the first resource and the second resource) cannot multiplex downlink symbols of the Uu link. In the example as shown in FIG. 8, during unicast communication between UE 61 and UE 62, UE 61 and UE 62 cannot use slots 0, 1 and 5 for data transmission and HARQ feedback.

Continuing to refer to FIG. 8, it is assumed that UE 61 knows that time domain positions of its PSSCH sending resource set within 10 ms are slot 2, slot 4, and slots 6 to 8 through configuration of the base station. In addition, each PSSCH sending resource merely occupies symbol 3 to symbol 11 of the corresponding slot.

Further, the base station configures feedback resources associated with the PSSCH sending resource set, and the associated feedback information indicates that a time difference between the PSSCH and the PSFCH is 2 slots.

Therefore, when UE 61 transmits data in the configured PSSCH sending resource set and needs to receive a feedback, according to the feedback resource determination method as shown in FIG. 1 and FIG. 2, UE 61 may add the time difference to a slot where a termination position of each sending resource in the PSSCH sending resource set is located so as to acquire a candidate slot. Specifically, in the example as shown in FIG. 8, the time difference of 2 slots is added to slot 2 to acquire slot 4; the time difference of 2 slots is added to slot 4 to acquire slot 6; the time difference of 2 slots is added to slot 6 to acquire slot 8; the time difference of 2 slots is added to slot 7 to acquire slot 9; and the time difference of 2 slots is added to slot 8 to acquire slot 0 of a next system frame (i.e., a system frame (n+1)).

Further, the PSFCH reception resource in the PSFCH reception resource set may be determined to be located at symbol 11 to symbol 12 of a slot by configuration or pre-configuration.

Therefore, it is determined that symbols 11 to 12 of slot 4 of the system frame n, symbols 11 to 12 of slot 6 of the system frame n, symbols 11 to 12 of slot 8 of the system frame n, symbols 11 to 12 of slot 9 of the system frame n, and symbol 11 to symbol 12 of slot 0 of the system frame (n+1) are the candidate time domain positions of the PSFCH reception resource in the embodiment. These slots may form the PSFCH candidate reception resource set in the embodiment.

When the unavailable symbol includes the downlink symbol of the Uu link, as slot 0 of the system frame (n+1) corresponds to downlink of the Uu link, symbols 11 to 12 of slot 0 cannot serve as a slot position of the PSFCH reception resource set.

The time domain position of each PSSCH reception resource in the PSSCH reception resource set of UE 61 may be determined by configuration or pre-configuration. Specifically, as shown in FIG. 8, assume that a time domain position of the PSSCH reception resource included in the PSSCH reception resource set is consistent with a time domain position of the PSSCH sending resource included in the PSSCH sending resource set.

Further, by performing steps as shown in FIG. 6, the PSFCH candidate reception resources that do not meet requirements in the PSFCH candidate reception resource set can be excluded based on the PSSCH reception resource set.

As slot 4, slot 6 and slot 8 include PSSCH reception resources, symbols 11 to 12 of slots 4, 6 and 8 can serve as slot positions of the PSFCH reception resource set.

As slot 9 does not include a PSSCH reception resource, symbols 11 to 12 of slot 9 cannot serve as a slot position of the PSFCH reception resource set.

Therefore, in the embodiment as shown in FIG. 8, the determined PSFCH reception resource set includes symbols 11 to 12 of slots 4, 6 and 8, while symbols 11 to 12 of slots 9 and 0 in the PSFCH candidate reception resource set are dropped.

When the unavailable symbol includes the downlink symbols and flexible symbols of the Uu link, as merely slot 4 and slot 9 correspond to uplink rather than downlink or flexible of the Uu link, the determined PSFCH reception resource set includes symbols 11 to 12 of slot 4, while symbols 11 to 12 of slots 6, 8, 9 and 0 in the PSFCH candidate reception resource set are dropped.

It should be noted that FIG. 8 takes the PSSCH reception resource set as an example for description, however, in practice, those skilled in the art may use the PSCCH reception resource set as a screening standard to determine a suitable PSFCH reception resource set.

Figure 9:
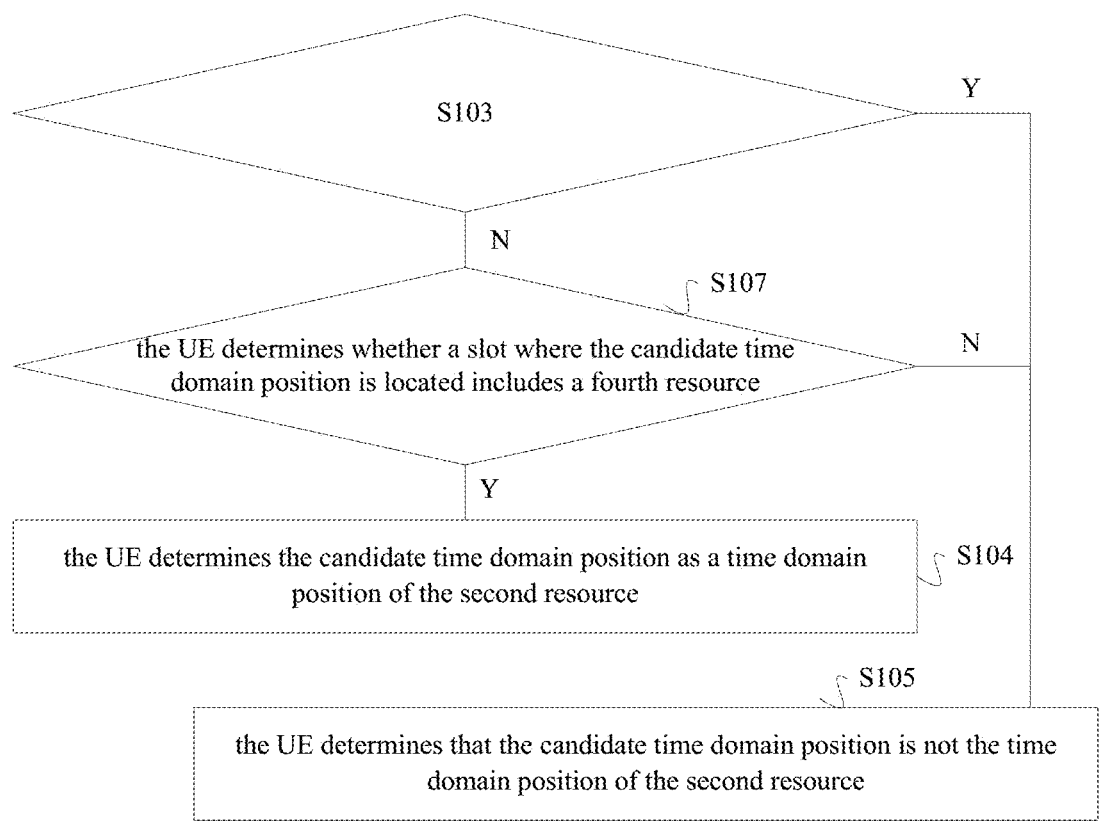
FIG. 9 is a flow chart of a feedback resource determination method for V2X service according to an embodiment.

Alternatively, referring to FIG. 9, in some embodiments, based on the symbols occupied by the candidate time domain position not including the unavailable symbol, the method may further include S107 prior to S104.

In S107, the UE determines whether a slot where the candidate time domain position is located includes a fourth resource based on the symbols occupied by the candidate time domain position not including the unavailable symbol, wherein the fourth resource is a transmission resource for the PSSCH or the PSCCH, and a data transmission direction of the fourth resource is the same as or different from a data transmission direction of the first resource.

Based on a determination result of S107 being that the slot where the candidate time domain position is located includes the fourth resource, S104 is performed, that is, the UE determines the candidate time domain position as the time domain position of the second resource.

Based on a determination result of S107 being that the slot where the candidate time domain position is located does not include the third resource, S105 is performed, that is, the UE determines that the candidate time domain position is not the time domain position of the second resource.

Therefore, integrity of transmission resources of the Uu link and resource utilization may be improved. Specifically, by the determination step, the candidate time domain positions whose corresponding slots do not contain the fourth resource may be excluded, so as to ensure the integrity of the transmission resources of the Uu link. In other words, by using the candidate time domain position in the slot that contains the fourth resource as the time domain position of the second resource, the transmission resources of the Uu link multiplexed by the resources of the sidelink (especially the transmission resource of the Uu link that does not include the fourth resource) are prevented from being frequently interrupted.

In some embodiments, the fourth resource may be the resource of the sidelink.

More specifically, the fourth resource may be acquired by configuration or pre-configuration. For example, by configuring or pre-configuring the fourth resource set, a time domain position of each fourth resource included in the fourth resource set in the resource pool is indicated.

In some embodiments, when the first resource is a sending resource, the second resource may be a reception resource, and the fourth resource may be a reception resource or a sending resource. For example, the first resource set may be a PSSCH sending resource set, the second resource may be a PSFCH reception resource, and the fourth resource may be a PSSCH reception resource, a PSCCH reception resource, a PSSCH sending resource or a PSCCH sending resource.

Alternatively, in some embodiments, if the first resource is a reception resource, the second resource may be a sending resource, and the fourth resource may be a reception resource or a sending resource. For example, the first resource set may be a PSSCH reception resource set, the second resource may be a PSFCH sending resource, and the fourth resource may be a PSSCH reception resource, a PSCCH reception resource, a PSSCH sending resource or a PSCCH sending resource.

In the below embodiment, the first resource set is the PSSCH reception resource set, the second resource is the PSFCH sending resource, and the fourth resource is the sending resource in the PSSCH sending resource set or the PSSCH reception resource set.

Figure 10:
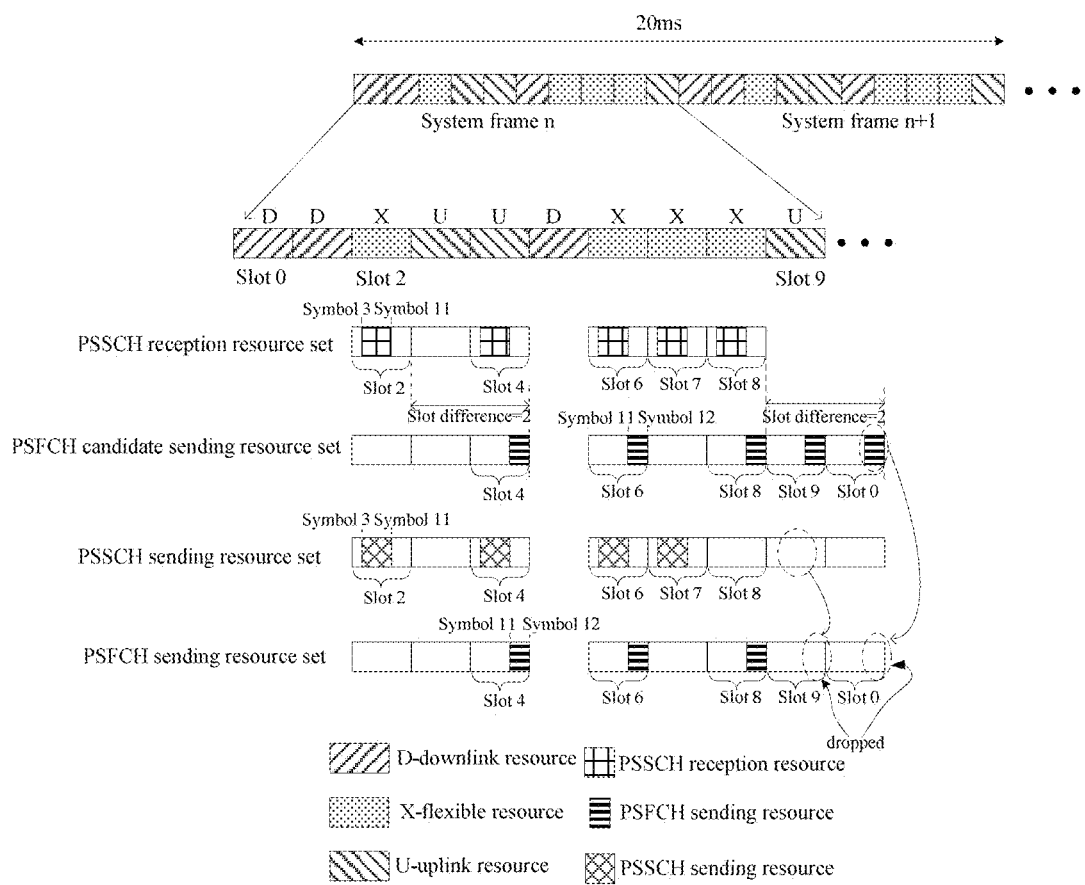
FIG. 10 is a diagram of a feedback resource determining process where the method as shown in FIG. 9 is applied to the scenario as shown in FIG. 3 according to an embodiment.

FIG. 10 exemplarily illustrates a time domain position of a transmission resource of the Uu link allocated by base station 63 in a slot of 20 milliseconds (ms). The transmission resource of the Uu link repeats in a time domain with a period of 10 ms.

As shown in FIG. 10, taking a system frame n as an example, assume that a slot structure of the Uu link in a period of 10 ms is DDXUUDXXXU, where each letter represents a direction of one slot, D represents downlink, X represents flexible, and U represents uplink. For example, a direction of slot 0 is D, indicating that a data transmission direction of slot 0 is downlink, and symbols of this slot are all downlink symbols. A direction of slot 2 is X, indicating that a data transmission direction of slot 2 is flexible, and symbols of this slot are all flexible symbols. A direction of slot 3 is U, indicating that a data transmission direction of slot 3 is uplink, and symbols of this slot are all uplink symbols.

Based on provisions of standards, resources of the sidelink (including the first resource and the second resource) cannot multiplex downlink symbols of the Uu link. In the example as shown in FIG. 10, during unicast communication between UE 61 and UE 62, UE 61 and UE 62 cannot use slots 0, 1 and 5 for data transmission and HARQ feedback.

Continuing to refer to FIG. 10, it is assumed that UE 62 knows that time domain positions of its PSSCH reception resource set within 10 ms are slot 2, slot 4, and slots 6 to 8 through configuration of the base station. In addition, each PSSCH reception resource merely occupies symbol 3 to symbol 11 of the corresponding slot.

Further, the base station configures feedback resources associated with the PSSCH reception resource set, and the associated feedback information indicates that a time difference between the PSSCH and the PSFCH is 2 slots.

Therefore, when UE 62 receives data in the configured PSSCH reception resource set and needs to send a feedback, according to the feedback resource determination method as shown in FIG. 1 and FIG. 2, UE 62 may add the time difference to a slot where a termination position of each reception resource in the PSSCH reception resource set is located so as to acquire a candidate slot. Specifically, in the example as shown in FIG. 10, the time difference of 2 slots is added to slot 2 to acquire slot 4; the time difference of 2 slots is added to slot 4 to acquire slot 6; the time difference of 2 slots is added to slot 6 to acquire slot 8; the time difference of 2 slots is added to slot 7 to acquire slot 9; and the time difference of 2 slots is added to slot 8 to acquire slot 0 of a next system frame (i.e., a system frame (n+1)).

Further, the PSFCH sending resource in the PSFCH sending resource set may be determined to be located at symbol 11 to symbol 12 of a slot by configuration or pre-configuration.

Therefore, it is determined that symbols 11 to 12 of slot 4 of the system frame n, symbols 11 to 12 of slot 6 of the system frame n, symbols 11 to 12 of slot 8 of the system frame n, symbols 11 to 12 of slot 9 of the system frame n, and symbol 11 to symbol 12 of slot 0 of the system frame (n+1) are the candidate time domain positions of the PSFCH sending resource in the embodiment. These slots may form the PSFCH candidate sending resource set in the embodiment.

When the unavailable symbol includes the downlink symbol of the Uu link, as slot 0 of the system frame (n+1) corresponds to downlink of the Uu link, symbols 11 to 12 of slot 0 cannot serve as a slot position of the PSFCH sending resource set.

The time domain position of each PSSCH sending resource in the PSSCH sending resource set of UE 62 may be determined by configuration or pre-configuration. Specifically, as shown in FIG. 10, the PSSCH sending resources included in the PSSCH sending resource set are located at slots 2, 4, 6 and 7 within a period of 10 ms.

Further, by performing steps as shown in FIG. 9, the PSFCH candidate sending resources that do not meet requirements can be excluded from symbols 11 to 12 of slots 4, 6, 8 and 9 based on the PSSCH sending resource set and the PSSCH reception resource set.

As slots 4 and 6 include both PSSCH reception resources and PSSCH sending resources, symbols 11 to 12 of slots 4 and 6 can serve as slot positions of the PSFCH sending resource set.

As slot 8 includes a PSSCH reception resource, symbols 11 to 12 of slot 8 can also serve as a slot position of the PSFCH sending resource set.

As slot 9 does not include a PSSCH sending resource or a PSSCH reception resource, symbols 11 to 12 of slot 9 cannot serve as a slot position of the PSFCH sending resource set.

Therefore, in the embodiment as shown in FIG. 10, the determined PSFCH sending resource set includes symbols 11 to 12 of slots 4, 6 and 8, while symbols 11 to 12 of slots 9 and 0 in the PSFCH candidate sending resource set are dropped.

When the unavailable symbol includes the downlink symbols and flexible symbols of the Uu link, as merely slot 4 and slot 9 correspond to uplink rather than downlink or flexible of the Uu link, and among them merely slot 4 includes at least one of the PSSCH sending resource and the PSSCH reception resource, the determined PSFCH sending resource set includes merely symbols 11 to 12 of slot 4, while symbols 11 to 12 of slots 6, 8, 9 and 0 in the PSFCH candidate sending resource set are dropped.

It should be noted that FIG. 10 takes the PSSCH sending resource set and the PSSCH reception resource set as an example for description, however, in practice, those skilled in the art may use the PSCCH sending resource set and the PSSCH reception resource set as a screening standard to determine a suitable PSFCH sending resource set.

In the below embodiment, the first resource set is a PSSCH sending resource set, the second resource is a PSFCH reception resource, and the fourth resource is a resource in a PSSCH reception resource set or in a PSSCH sending resource set.

Figure 11:
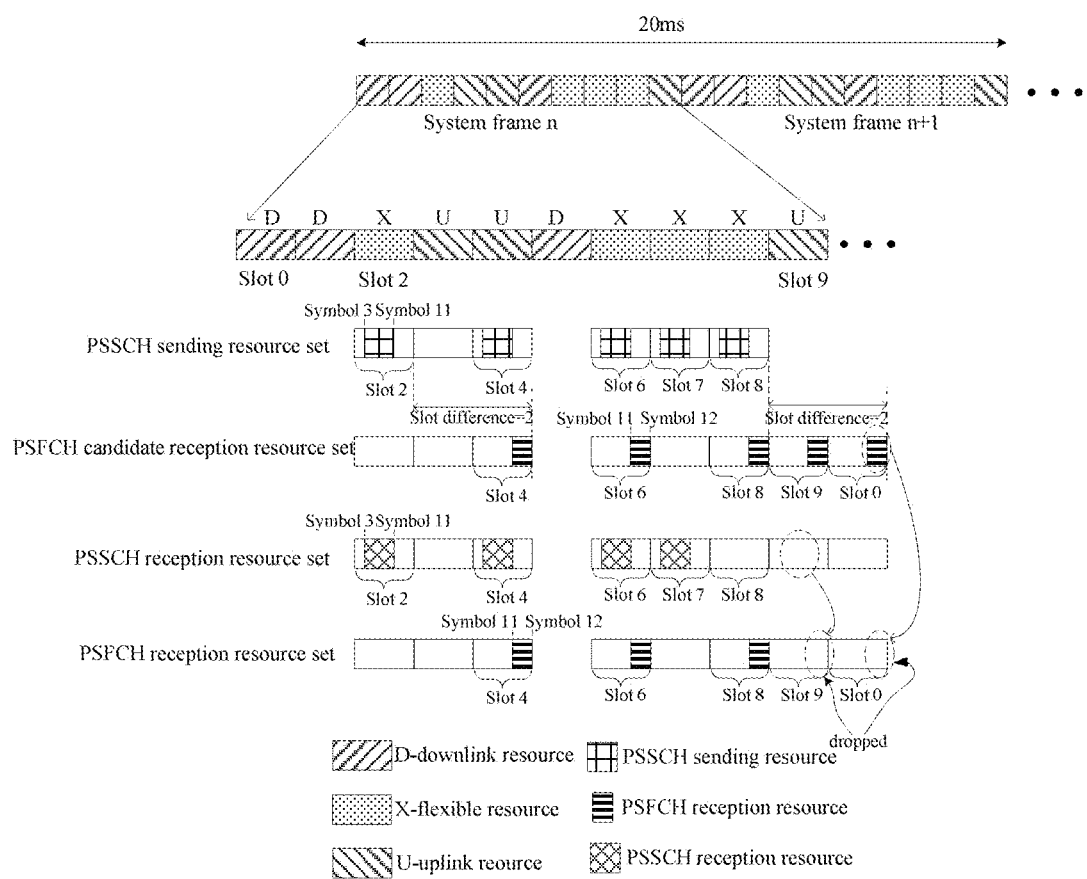
FIG. 11 is a diagram of a feedback resource determining process where the method as shown in FIG. 9 is applied to the scenario as shown in FIG. 3 according to another embodiment.

FIG. 11 exemplarily illustrates a time domain position of a transmission resource of the Uu link allocated by base station 63 in a slot of 20 milliseconds (ms). The transmission resource of the Uu link repeats in the time domain with a period of 10 ms.

As shown in FIG. 11, taking a system frame n as an example, assume that a slot structure of the Uu link in a period of 10 ms is DDXUUDXXXU, where each letter represents a direction of one slot, D represents downlink, X represents flexible, and U represents uplink. For example, a direction of slot 0 is D, indicating that a data transmission direction of slot 0 is downlink, and symbols of this slot are all downlink symbols. A direction of slot 2 is X, indicating that a data transmission direction of slot 2 is flexible, and symbols of this slot are all flexible symbols. A direction of slot 3 is U, indicating that a data transmission direction of slot 3 is uplink, and symbols of this slot are all uplink symbols.

Based on provisions of standards, resources of the sidelink (including the first resource and the second resource) cannot multiplex downlink symbols of the Uu link. In the example as shown in FIG. 11, during unicast communication between UE 61 and UE 62, UE 61 and UE 62 cannot use slots 0, 1 and 5 for data transmission and HARQ feedback.

Continuing to refer to FIG. 11, it is assumed that UE 61 knows that time domain positions of its PSSCH sending resource set within 10 ms are slot 2, slot 4, and slots 6 to 8 through configuration of the base station. In addition, each PSSCH sending resource merely occupies symbol 3 to symbol 11 of the corresponding slot.

Further, the base station configures feedback resources associated with the PSSCH sending resource set, and the associated feedback information indicates that a time difference between the PSSCH and the PSFCH is 2 slots.

Therefore, when UE 61 transmits data in the configured PSSCH sending resource set and needs to receive a feedback, according to the feedback resource determination method as shown in FIG. 1 and FIG. 2, UE 61 may add the time difference to a slot where a termination position of each sending resource in the PSSCH sending resource set is located so as to acquire a candidate slot. Specifically, in the example as shown in FIG. 11, the time difference of 2 slots is added to slot 2 to acquire slot 4; the time difference of 2 slots is added to slot 4 to acquire slot 6; the time difference of 2 slots is added to slot 6 to acquire slot 8; the time difference of 2 slots is added to slot 7 to acquire slot 9; and the time difference of 2 slots is added to slot 8 to acquire slot 0 of a next system frame (i.e., a system frame (n+1)).

Further, the PSFCH reception resource in the PSFCH reception resource set may be determined to be located at symbol 11 to symbol 12 of a slot by configuration or pre-configuration.

Therefore, it is determined that symbols 11 to 12 of slot 4 of the system frame n, symbols 11 to 12 of slot 6 of the system frame n, symbols 11 to 12 of slot 8 of the system frame n, symbols 11 to 12 of slot 9 of the system frame n, and symbol 11 to symbol 12 of slot 0 of the system frame (n+1) are the candidate time domain positions of the PSFCH reception resource in the embodiment. These slots may form the PSFCH candidate reception resource set in the embodiment.

When the unavailable symbol includes the downlink symbol of the Uu link, as slot 0 of the system frame (n+1) corresponds to downlink of the Uu link, symbols 11 to 12 of slot 0 cannot serve as a slot position of the PSFCH reception resource set.

The time domain position of each PSSCH reception resource in the PSSCH reception resource set of UE 61 may be determined by configuration or pre-configuration. Specifically, as shown in FIG. 11, the PSSCH reception resources included in the PSSCH reception resource set are located at slots 2, 4, 6 and 7 within a period of 10 ms.

Further, by performing steps as shown in FIG. 9, the PSFCH candidate reception resources that do not meet requirements can be excluded from symbols 11 to 12 of slots 4, 6, 8 and 9 based on the PSSCH reception resource set and the PSSCH sending resource set.

As slot 4, slot 6 and slot 8 include both PSSCH reception resources and PSSCH sending resources, symbols 11 to 12 of slots 4 and 6 can serve as slot positions of the PSFCH reception resource set.

As slot 8 includes a PSSCH sending resource, symbols 11 to 12 of slot 8 can also serve as a slot position of the PSFCH reception resource set.

As slot 9 does not include a PSSCH reception resource or a PSSCH sending resource, symbols 11 to 12 of slot 9 cannot serve as a slot position of the PSFCH reception resource set.

Therefore, in the embodiment as shown in FIG. 11, the determined PSFCH reception resource set includes symbols 11 to 12 of slots 4, 6 and 8, while symbols 11 to 12 of slots 9 and 0 in the PSFCH candidate reception resource set are dropped.

When the unavailable symbol includes the downlink symbols and flexible symbols of the Uu link, as merely slot 4 and slot 9 correspond to uplink rather than downlink or flexible of the Uu link, and among them merely slot 4 includes at least one of the PSSCH reception resource and the PSSCH sending resource, the determined PSFCH reception resource set includes symbols 11 to 12 of slot 4, while symbols 11 to 12 of slots 6, 8, 9 and 0 in the PSFCH candidate reception resource set are dropped.

It should be noted that FIG. 11 takes the PSSCH reception resource set and the PSSCH sending resource set as an example for description, however, in practice, those skilled in the art may use the PSCCH reception resource set and the PSSCH sending resource set as a screening standard to determine a suitable PSFCH reception resource set.

For a sender in an NR V2X service, solutions provided in the embodiments as shown in FIG. 1 to FIG. 11 may be used to determine a time domain position of the feedback reception resource, and a frequency domain position of the feedback reception resource may be determined using other technologies. Further, feedback information corresponding to sidelink data sent is received on the determined time and frequency domain positions of the feedback reception resource.

Further, if the time domain position of the feedback reception resource cannot be found using the above method, no feedback is received.

For a receiver in an NR V2X service, solutions provided in the embodiments as shown in FIG. 1 to FIG. 11 may be used to determine a time domain position of the feedback sending resource, and a frequency domain position of the feedback sending resource may be determined using other technologies. Further, feedback information corresponding to received sidelink data is sent on the determined time and frequency domain positions of the feedback sending resource.

Further, if the time domain position of the feedback sending resource cannot be found using the above method, no feedback is sent.

Alternatively, in some embodiments, the above embodiments as shown in FIG. 1 to FIG. 11 may be performed by a UE within a network coverage area, while for a UE beyond the network coverage, S103 to S105 in the embodiment as shown in FIG. 1 may be omitted.

In other words, for the UE beyond the network coverage, the symbols occupied by each candidate time domain position are available symbols. Accordingly, after S102 is performed to determine the candidate time domain position of the second resource, the determined candidate time domain position may be directly determined as the time domain position of the second resource.

In some embodiments, the method further includes: prior to determining whether symbols occupied by the candidate time domain position include an unavailable symbol, determining whether a UE is within a network coverage; and determining each candidate time domain position as the time domain position of the second resource based on the UE being beyond the network coverage.

Therefore, solutions of the embodiments may be pointedly adapted to UEs in different positions.

Figure 12:
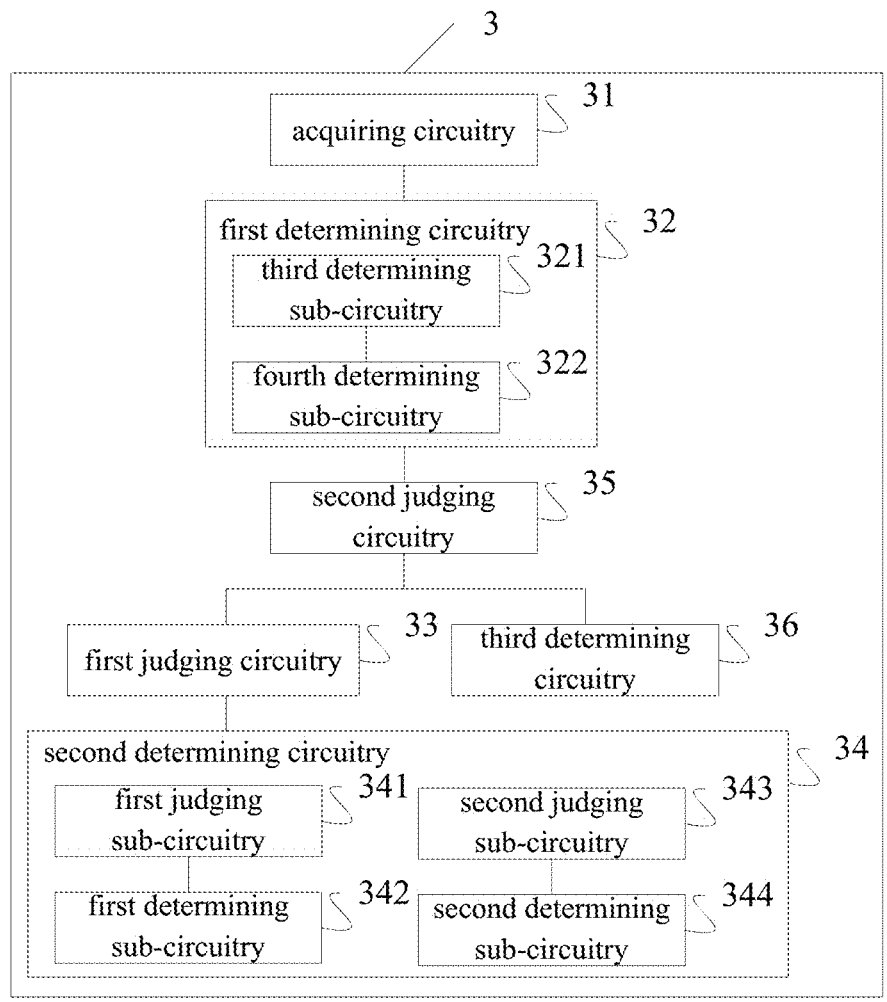
FIG. 12 is a structural diagram of a feedback resource determination apparatus for V2X service according to an embodiment.

FIG. 12 is a structural diagram of a feedback resource determination apparatus for V2X service according to an embodiment. Those skilled in the art could understand that the feedback resource determination apparatus 3 for V2X service provided in the embodiment may be used to implement the method provided in the embodiments as shown in FIGS. 1 to 11.

In the embodiment, the feedback resource determination apparatus 3 may include: an acquiring circuitry 31 configured to acquire a first resource set, wherein the first resource set includes a time domain position of at least one first resource which is a transmission resource for a PSSCH; a first determining circuitry 32 configured to: for each of the at least one first resource, determine a candidate time domain position of a second resource corresponding to the first resource based on the time domain position of the first resource and associated feedback information, wherein the second resource is a transmission resource for a PSFCH, and the associated feedback information indicates a time difference between the PSSCH and the PSFCH; a first judging circuitry 33 configured to: for each candidate time domain position, determine whether symbols occupied by the candidate time domain position include an unavailable symbol, wherein the unavailable symbol is a symbol that cannot be used to transmit the second resource; and a second determining circuitry 34 configured to determine the candidate time domain position as a time domain position of the second resource based on the symbols occupied by the candidate time domain position not including the unavailable symbol.

In some embodiments, the second determining circuitry 34 includes: a first judging sub-circuitry 341 configured to determine whether a slot where the candidate time domain position is located includes a third resource based on the symbols occupied by the candidate time domain position not including the unavailable symbol, wherein the third resource is a transmission resource for the PSSCH or the PSCCH, and a data transmission direction of the third resource is different from a data transmission direction of the first resource; and a first determining sub-circuitry 342 configured to determine the candidate time domain position as the time domain position of the second resource based on the slot where the candidate time domain position is located including the third resource.

In some embodiments, the third resource is a reception resource based on the first resource being a sending resource, and the third resource is a sending resource based on the first resource being a reception resource.

In some embodiments, the second determining circuitry 34 includes: a second judging sub-circuitry 343 configured to determine whether a slot where the candidate time domain position is located includes a fourth resource based on the symbols occupied by the candidate time domain position not including the unavailable symbol, wherein the fourth resource is a transmission resource for the PSSCH or the PSCCH, and a data transmission direction of the fourth resource is the same as or different from a data transmission direction of the first resource; and a second determining sub-circuitry 344 configured to determine the candidate time domain position as the time domain position of the second resource based on the slot where the candidate time domain position is located including the fourth resource.

In some embodiments, the fourth resource is a reception resource or a sending resource based on the first resource being a sending resource, and the fourth resource is a reception resource or a sending resource based on the first resource being a reception resource.

In some embodiments, the first determining circuitry 32 includes: a third determining sub-circuitry 321 configured to determine a candidate slot where the second resource is located based on a slot where a termination position of the first resource is located and the associated feedback information; and a fourth determining sub-circuitry 322 configured to determine the candidate time domain position of the second resource in the candidate slot based on configured or pre-configured position information of the second resource in the candidate slot.

In some embodiments, the second resource is a reception resource based on the first resource being a sending resource, and the second resource is a sending resource based on the first resource being a reception resource.

In some embodiments, the first resource set is acquired by configuration or pre-configuration, the associated feedback information is determined by configuration or pre-configuration, and the first resource set has a one-to-one correspondence with the associated feedback information.

In some embodiments, the first resource and the second resource are resources of a sidelink and multiplex a transmission resource of a Uu link, and the unavailable symbol includes a downlink symbol of the Uu link.

In some embodiments, the unavailable symbol further includes a flexible symbol of the Uu link.

In some embodiments, the feedback resource determination apparatus 3 further includes a second judging circuitry 35 configured to determine whether a UE is within a network coverage before whether symbols occupied by the candidate time domain position include an unavailable symbol is determined; and a third determining circuitry 36 configured to determine each candidate time domain position as the time domain position of the second resource based on the UE being beyond the network coverage.

Further, the first judging circuitry 33 is called to perform corresponding operations based on the second judging circuitry 35 determining that the UE is within the network coverage.

More details of working principles and working modes of the feedback resource determination apparatus 3 can be found in the above descriptions of FIG. 1 to FIG. 11, and are not described here.

In an embodiment of the present disclosure, a storage medium having computer instructions stored therein is provided, wherein when the computer instructions are executed, the above method as shown in FIGS. 1 to 11 is performed. In some embodiments, the storage medium may include a computer readable storage medium, such as a non-volatile memory or a non-transitory memory. The computer readable storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the above method as shown in FIGS. 1 to 11 is performed. In some embodiments, the terminal may be a UE applied in an NR V2X scenario.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A feedback resource determination method for vehicle-to-everything (V2X) service, comprising:
   acquiring a first resource set, wherein the first resource set comprises a time domain position of at least one first resource which is a transmission resource for a Physical Sidelink Shared Channel (PSSCH);
   for each of the at least one first resource, determining a candidate time domain position of a second resource corresponding to the first resource based on the time domain position of the first resource and associated feedback information, wherein the second resource is a transmission resource for a Physical Sidelink Feedback Channel (PSFCH), the associated feedback information is determined by configuration or pre-configuration and indicates a time difference between the PSSCH and the PSFCH, the first resource set has a one-to-one correspondence with the associated feedback information, and time differences included in the associated feedback information corresponding to different resource sets are different;
   for each candidate time domain position, determining whether symbols occupied by the candidate time domain position comprise an unavailable symbol, wherein the unavailable symbol is a symbol that cannot be used to transmit the second resource; and
   defining the candidate time domain position as a time domain position of the second resource based on that the symbols occupied by the candidate time domain position do not comprise the unavailable symbol.

2. The method according to claim 1, wherein said defining the candidate time domain position as a time domain position of the second resource based on that the symbols occupied by the candidate time domain position do not comprise the unavailable symbol comprises:
   determining whether a slot where the candidate time domain position is located comprises a third resource based on that the symbols occupied by the candidate time domain position do not comprise the unavailable symbol, wherein the third resource is a transmission resource for the PSSCH or the PSCCH, and a data transmission direction of the third resource is different from a data transmission direction of the first resource; and
   determining the candidate time domain position as the time domain position of the second resource based on the slot where the candidate time domain position is located comprising the third resource.

3. The method according to claim 2, wherein the third resource is a reception resource based on the first resource being a sending resource, and the third resource is a sending resource based on the first resource being a reception resource.

4. The method according to claim 1, wherein said defining the candidate time domain position as a time domain position of the second resource based on that the symbols occupied by the candidate time domain position do not comprise the unavailable symbol comprises:

determining whether a slot where the candidate time domain position is located comprises a fourth resource based on that the symbols occupied by the candidate time domain position do not comprise the unavailable symbol, wherein the fourth resource is a transmission resource for the PSSCH or the PSCCH, and a data transmission direction of the fourth resource is the same as or different from a data transmission direction of the first resource; and defining the candidate time domain position as the time domain position of the second resource based on the slot where the candidate time domain position is located comprising the fourth resource.

5. The method according to claim 4, wherein the fourth resource is a reception resource or a sending resource based on the first resource being a sending resource, and the fourth resource is a reception resource or a sending resource based on the first resource being a reception resource.

6. The method according to claim 1, wherein said determining a candidate time domain position of a second resource corresponding to the first resource based on the time domain position of the first resource and associated feedback information comprises:

determining a candidate slot where the second resource is located based on a slot where a termination position of the first resource is located and the associated feedback information; and determining the candidate time domain position of the second resource in the candidate slot based on configured or pre-configured position information of the second resource in the candidate slot.

7. The method according to claim 1, wherein the second resource is a reception resource based on the first resource being a sending resource, and the second resource is a sending resource based on the first resource being a reception resource.

8. The method according to claim 1, wherein the first resource set is acquired by configuration or pre-configuration.

9. The method according to claim 1, wherein the first resource and the second resource are resources of a sidelink and multiplex a transmission resource of a Uu link, and the unavailable symbol comprises a downlink symbol of the Uu link.

10. The method according to claim 1, further comprising:
prior to determining whether symbols occupied by the candidate time domain position comprise an unavailable symbol, determining whether a User Equipment (UE) is within a network coverage; and
defining each candidate time domain position as the time domain position of the second resource based on the UE being beyond the network coverage.

11. A non-transitory storage medium storing one or more programs, the one or more programs comprising computer instructions, which, when executed by a processor, cause the processor to:
acquire a first resource set, wherein the first resource set comprises a time domain position of at least one first resource which is a transmission resource for a Physical Sidelink Shared Channel (PSSCH);
for each of the at least one first resource, determine a candidate time domain position of a second resource corresponding to the first resource based on the time domain position of the first resource and associated feedback information, wherein the second resource is a transmission resource for a Physical Sidelink Feedback Channel (PSFCH), the associated feedback information is determined by configuration or pre-configuration and indicates a time difference between the PSSCH and the PSFCH, the first resource set has a one-to-one correspondence with the associated feedback information, and time differences included in the associated feedback information corresponding to different resource sets are different;

for each candidate time domain position, determine whether symbols occupied by the candidate time domain position comprise an unavailable symbol, wherein the unavailable symbol is a symbol that cannot be used to transmit the second resource; and define the candidate time domain position as a time domain position of the second resource based on that the symbols occupied by the candidate time domain position do not comprise the unavailable symbol.

12. The non-transitory storage medium according to claim 11, wherein said determining the candidate time domain position as a time domain position of the second resource based on that the symbols occupied by the candidate time domain position do not comprise the unavailable symbol comprises:

determining whether a slot where the candidate time domain position is located comprises a third resource based on that the symbols occupied by the candidate time domain position do not comprise the unavailable symbol, wherein the third resource is a transmission resource for the PSSCH or the PSCCH, and a data transmission direction of the third resource is different from a data transmission direction of the first resource; and determining the candidate time domain position as the time domain position of the second resource based on the slot where the candidate time domain position is located comprising the third resource.

13. The non-transitory storage medium according to claim 12, wherein the third resource is a reception resource based on the first resource being a sending resource, and the third resource is a sending resource based on the first resource being a reception resource.

14. The non-transitory storage medium according to claim 11, wherein said determining the candidate time domain position as a time domain position of the second resource based on that the symbols occupied by the candidate time domain position do not comprise the unavailable symbol comprises:

determining whether a slot where the candidate time domain position is located comprises a fourth resource based on that the symbols occupied by the candidate time domain position do not comprise the unavailable symbol, wherein the fourth resource is a transmission resource for the PSSCH or the PSCCH, and a data transmission direction of the fourth resource is the same as or different from a data transmission direction of the first resource; and determining the candidate time domain position as the time domain position of the second resource based on the slot where the candidate time domain position is located comprising the fourth resource.

15. The non-transitory storage medium according to claim 14, wherein the fourth resource is a reception resource or a sending resource based on the first resource being a sending resource, and the fourth resource is a reception resource or a sending resource based on the first resource being a reception resource.

16. The non-transitory storage medium according to claim 11, wherein said determining a candidate time domain position of a second resource corresponding to the first resource based on the time domain position of the first resource and associated feedback information comprises:
  determining a candidate slot where the second resource is located based on a slot where a termination position of the first resource is located and the associated feedback information; and
  determining the candidate time domain position of the second resource in the candidate slot based on configured or pre-configured position information of the second resource in the candidate slot.

17. The non-transitory storage medium according to claim 11, wherein the second resource is a reception resource based on the first resource being a sending resource, and the second resource is a sending resource based on the first resource being a reception resource.

18. The non-transitory storage medium according to claim 11, wherein the first resource set is acquired by configuration or pre-configuration.

19. The non-transitory storage medium according to claim 11, wherein the first resource and the second resource are resources of a sidelink and multiplex a transmission resource of a Uu link, and the unavailable symbol comprises a downlink symbol of the Uu link.

20. A terminal comprising a memory and a processor, wherein the memory stores one or more programs, and the one or more programs comprise computer instructions, which, when executed by a processor, cause the processor to:
  acquire a first resource set, wherein the first resource set comprises a time domain position of at least one first resource which is a transmission resource for a Physical Sidelink Shared Channel (PSSCH);
  for each of the at least one first resource, determine a candidate time domain position of a second resource corresponding to the first resource based on the time domain position of the first resource and associated feedback information, wherein the second resource is a transmission resource for a Physical Sidelink Feedback Channel (PSFCH), the associated feedback information is determined by configuration or pre-configuration and indicates a time difference between the PSSCH and the PSFCH, the first resource set has a one-to-one correspondence with the associated feedback information, and time differences included in the associated feedback information corresponding to different resource sets are different;
  for each candidate time domain position, determine whether symbols occupied by the candidate time domain position comprise an unavailable symbol, wherein the unavailable symbol is a symbol that cannot be used to transmit the second resource; and
  define the candidate time domain position as a time domain position of the second resource based on that the symbols occupied by the candidate time domain position do not comprise the unavailable symbol.

* * * * *